United States Patent [19]

Feltzin et al.

[11] 3,709,684
[45] Jan. 9, 1973

[54] PHOTOCONDUCTIVE COMPOSITIONS AND ELEMENTS EMPLOYING POLYOXYALKYLENE BISPHENOL A FUMARATES AS BINDERS

[75] Inventors: Joseph Feltzin; Erich Kuehn; George O. Rudkin, Jr., all of Wilmington, Del.

[73] Assignee: ICA America Inc., Wilmington, Del.

[22] Filed: Dec. 11, 1970

[21] Appl. No.: 97,339

[52] U.S. Cl. ...................96/1.5, 96/1.8, 252/501
[51] Int. Cl. ..........G03g 5/00, G03g 7/00, G03g 5/08
[58] Field of Search ...............96/1.5, 1.8; 252/501

[56] References Cited

UNITED STATES PATENTS 3,245,786  4/1966  Cassiers et al. ..........................96/1
3,025,160  3/1962  Bunge et al. ..............................96/1
3,396,016  8/1968  Olson .......................................96/1.8
3,406,063  10/1968  Matkan et al. ..........................96/1.5
3,437,481  4/1969  Graver et al. ...........................96/1.8
3,408,184  10/1968  Mammino ................................96/1.5

Primary Examiner—Charles E. Van Horn
Assistant Examiner—M. B Wittenberg
Attorney—Kenneth E. Mulford and Roger R. Horton

[57] ABSTRACT

Photoconductive recording materials for use in electrophotography processes are disclosed. A photoconductive composition for use in preparing the photoconductive recording materials is also disclosed as well as means for preparing the photoconductive recording materials. The particular photoconductive composition contains polyester resins based upon an etherified diphenol material and a dicarboxylic acid.

13 Claims, No Drawings

PHOTOCONDUCTIVE COMPOSITIONS AND ELEMENTS EMPLOYING POLYOXYALKYLENE BISPHENOL A FUMARATES AS BINDERS

This invention relates to photoconductive recording materials and to photoconductive compositions. More specifically this invention relates to photoconductive recording materials and photoconductive compositions for use in the ELECTROFAX, electrophotographic processes. More particularly, this invention relates to photoconductive recording materials which are multilayer laminates consisting of said photoconductive composition and a conductive substrate. Still more particularly, the photoconductive composition consists of a polyester resin and a photoconductive pigment.

Since the development of the direct and indirect electrophotographic processes, that is the ELECTROFAX and xerographic process respectively, the direct process has been at a distinct disadvantage due to the requirement that the photoconductive paper in the direct process must have the proper conductive properties to maintain a charged image and yet it must also compete with a commercial bond paper in its aesthetic properties. Thus, the photoconductive paper should weigh approximately the same amount as good grade bond paper, that is about 60 pounds per ream, and have the same crease and tear resistance as bond paper. However, the photoconductive paper must exhibit the desired electrophotographic properties for producing clear, distinct copies. These properties include: that the surface of the paper be able to maintain a high electrical charge, or have a high charge potential; that the paper once charged be able to maintain the charge as long as it is kept in an unilluminated environment, that is the paper should have a low dark decay rate; and finally that once the paper has been exposed to a light source that the charge in the highly illuminated areas rapidly decay to 0, that is the paper must have a high light decay rate. The ideal paper for a direct process would appear to a layman to be ordinary bond paper and perform in its electrophotographic duties as well as a selenium drum in a xerographic process.

Naturally, all the electrophotographic properties mentioned above are not usually present at an optimum level in any particular photoconductive recording material used in a direct process. However, a proper combination of dark decay rate, charge potential and light decay rate is needed to provide a paper which will produce a clear copy. A photoconductive recording material comprises two distinct and functionally different layers. The top layer is usually composed of a photoconductive pigment such as zinc oxide and a binder resin which is an electrical insulator. The second layer is a conductive substrate which may be comprises of paper coated with a conductive resin, or other conductive substrates such as metal impregnated paper. Thus a combination of a conductive substrate and a photoconductive composition coated thereon is desired which would yield clear prints, which would not be disturbed during normal handling, and which would appear to be bond paper.

It is an object of this invention to provide a photoconductive recording material which has a bond paper weight.

It is another object of this invention to provide a photoconductive recording material which has a low dark decay rate.

It is another object of this invention to provide a photoconductive recording material which has a high charge potential.

It is another object of this invention to provide a photoconductive recording material which has a high light decay rate.

It is another object of this invention to provide a photoconductive composition which provides excellent properties as the upper layer of a photoconductive recording material.

These and still other objects will come apparent to those skilled in the art from the following detailed description of the invention.

In general this invention provides a photoconductive composition which comprises a photoconductive pigment and an electrically insulating polyester resin of a dicarboxylic acid and a polyol, said polyol comprising an etherified diphenol.

This invention also provides a photoconductive recording material which comprises a photoconductive composition described above coated on a conductive substrate.

Said etherified diphenol used in the insulating polyester resin of the photoconductive composition of this invention, may be represented by the following formula:

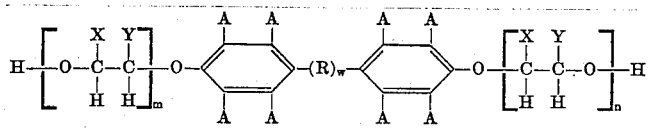

In this formula w represents an integer of 0 or 1; R is an alkylene radical of one to five carbon atoms, oxygen, sulfur or a divalent radical represented by the formula

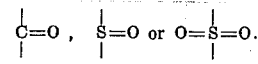

Each A is individually selected from either a halogen atom or a hydrogen atom; the letters $m$ and $n$ are integers from 0 through 6 with the proviso that the sum of $m$ and $n$ is at least about 2 and less than 7; and X and Y are radicals which are individually selected from the following group: alkyl radicals of one to three carbon atoms, a phenyl radical, or a hydrogen atom; provided that in any X and Y pair on adjacent carbon atoms either X or Y is a hydrogen atom. A preferred group of etherified diphenols within the above formula include those where each A is either a chlorine atom atom or hydrogen and/or R is an alkylene radical containing one to three carbon atoms, and X and Y are either hydrogen or a methyl radical. In this preferred group the average sum of n and m is at most about 3. Examples of etherified diphenols within the above formula include the following: polyoxyethylene(3)-2,2bis(4-hydroxyphenyl) propane; polyoxystyrene(6)-bis(2,6- dibromo-4-hydroxyphenyl) methane; polyoxybutylene(2.5)-bis(4-hydroxyphenyl) ketone; polyoxyethylene(3)-bis(4-hydroxyphenyl) ether; polyoxystyrene(2.8)-bis(2,6-dibromo-4-hydroxyphenyl) thioether; polyoxypropylene(3)bis(4-hydroxyphenyl) sulfone; polyoxystyrene(2)-bis(2,6-dichloro-4-hydroxyphenyl) ethane; polyoxyethylene(3)-bis(4-hydroxyphenyl) thioether; polyoxy-propylene(4)-4,4'-bisphenol; polyoxyethylene(7)-bis(2,3,6-trifluorodichloro-4-hydroxyphenyl) ether; polyoxyethylene(3.5)-4,4-bis(4-hydroxyphenyl) pentane; polyoxystyrene(4)-2-fluoro-4-hydroxyphenyl, 4-hydroxyphenyl sulfoxide; and polyoxybutylene(2)-3,2-bis(2,3,6-tribromo-4-hydroxyphenyl) butane.

A class of readily available etherified diphenols within the above formula are the bisphenols. A preferred class of etherified bisphenols are those prepared from 2,2-bis(4-hydroxy-phenyl) propane or the corresponding 2,6,2',6'-tetrachloro or tetrafluoro bisphenol alkoxylated with from 2 to 4 mols of propylene or ethylene oxide per mol of bisphenol.

In addition to said etherified diphenol a dihydroxy alkane may be used in preparing the insulating polyester resins of the photoconductive composition of this invention. These dihydroxy alkanes contain from two to eight carbon atoms. A preferred group of dihydroxy alkanes include propylene glycol, ethylene glycol, and neopentyl glycol. Examples of other dihydroxy alkanes which can be used include 1,3-dihydroxybutane, 1,4-dihydroxypentane, 1,2-dihydroxyhexane, 2,3-dihydroxybutane, and 1,2-dihydroxyoctane. In general the dihydroxy alkane may be present at levels of up to 60 weight percent of the polyol used in preparing said insulating polyester.

Polyhydroxy alkanes which contain from three to six hydroxyl groups and from three to six carbon atoms may also be incorporated as an additional polyol in preparing the insulating polyester resins of this invention. Exemplary of these polyhydroxy alkanes are sorbitol, pentaerythritol, xylitol, 1,2,3-butanetriol, and 1,2,5,6-hexanetetrol. Polyoxyethylene and polyoxypropylene derivatives of the aforementioned polyhydroxyalkanes which contain up to about 5 mols of oxyethylene or oxypropylene per mol of hydroxyl of said polyhydroxy alkane and preferably 1 mol of oxyethylene or oxypropylene per mol can be used. Examples of these polyhydroxy alkane derivatives include polyoxyethylene(10) mannitol, polyoxyethylene(15) pentaerythritol, polyoxyethylene((6) sorbitol and polyoxypropylene(15) 1,2,3-butanetriol. These polyhydroxy alkanes and derivatives thereof are usually present as at most about 3 parts by weight per 100 parts of said etherified diphenol, and preferably less than two parts by weight. In a preferred group of polyol blends the weight ratio of etherified diphenols to dihydroxy alkanes is from 1.5 to 0.67. Polyol blends containing etherified diphenols, polyhydroxy alkanes and dihydroxy alkanes within the limits set out above are also within the polyol blends contemplated.

In general the dicarboxylic acid used in preparing the electrical insulating polyester resins of the photoconductive composition of this invention may be saturated or ethylenically unsaturated, and may contain substituents such as halogen. Among these dicarboxylic acids are the following: phthalic acid, fumaric acid, maleic acid, succinic acid, isophthalic acid, malonic acid, cyclohexane dicarboxylic acid, glutaric acid, adipic acid, and the anhydrides of these acids. A preferred group of acids and anhydrides include fumaric, maleic, and succinic acids.

The insulating polyesters of this invention may be prepared by the reaction of the dicarboxylic acid with the etherified diphenol. The reaction may be performed in an inert atmosphere employing moderate temperatures and substantially atmospheric pressures during the early stage, thus minimizing the loss of dicarboxylic acid by volatilization. As the reaction proceeds the temperature may be increased and the pressure reduced. Esterification catalyst may be used although it is generally preferred to carry out the reaction in the absence of excessive amounts of catalyst to avoid contamination of the final resinous product. Where an unsaturated dicarboxylic acid is used, it is usually desirable to include a small amount of polymerization inhibitor such as hydroquinone, pyrogallol, or the like. The reaction temperature required for preparing the final polyesters of this invention will usually include heating to about 200°C. for a portion of the reaction. The resultant polyesters usually have low acid numbers; that is acid numbers less than about 30. Usually the ratio of carboxyl groups and hydroxyl groups in the reaction mixture used for preparing the polyester resins of this invention is about 1. However, ratios as low as about 0.8 and as high as about 1.2 can readily be used.

A superior insulating polyester resin for use in preparing the photoconductive compositions of this invention may be prepared by reacting up to about 4 weight percent, based on weight of insulating polyester resin, of an organic epoxy compound having a molecular weight of from about 44 to 1000 or an alkoxylated phenol or an alkoxylated alkyl phenol with the polyester resins disclosed above. The expression "organic epoxy compounds" is used to include only those compounds containing at least one

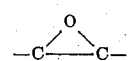

group, that is vicinal epoxy compounds. The epoxy compounds may be saturated or unsaturated, straight chain or branched chain, aliphatic, cycloaliphatic, aromatic, or heterocyclic. Mixtures of epoxy compounds may also be used to prepare these compositions. Among the numerous epoxy compounds and alkoxylated phenolic compounds which may be used in accordance with this invention are vinyl cyclohexanedioxide, diglycidyl ether of 2,2-di(4-hydroxyphenyl) propane; phenylglycidyl ether; 1,2-epoxyeicosane; cylcooctane epoxide; 1,2-epoxyoctane; epichlorohydrin; ethylene oxide; butylene oxide; styrene oxide; cyclohexane oxide; 3,4-hexylethylene oxide; hydroxyethyl, 2-methylphenyl ether; polyoxypropylene(3) phenol; polyoxybutylene (1.5)-6-propylphenol; polyoxyethylene(4)-4-pentylphenol; and 3,4-epoxycyclohexylethyl trimethoxysilane.

The reaction of the epoxy compounds or phenolic compounds with the polyester takes place at a temperature of from about 125°C. to about 200°C., and a reaction time of about a half hour to 10 hours has been found satisfactory. The polyester composition is modified with said epoxy or phenolic compound after the polyesterification is completed or prior to complete esterification so long as 70 percent of the esterification reaction is complete. The addition of the epoxy compound prior to 70 percent of the polyesterification being completed results in inferior resins.

The weight ratios of the organic epoxy compounds or phenolic compounds to the polyester compositions will vary widely, however, a weight ratio of from about 0.01 to 0.05 is preferred.

The photoconductive pigment used in preparing the photoconductive composition of this invention may be any pigment which can maintain a charge in unilluminated surroundings when insulated from its environment and yet dissipate this charge rapidly in the presence of a light source. Photoconductive pigments such as zinc oxide, zinc sulfide, antimony dioxide, selenium oxide, and those enumerated in U.S. Patent No. RE. 25,444 may be used in this invention.

In the photoconductive compositions of this invention the weight ratio of photoconductive pigment to insulating polyester resin will usually be from about 15 to about 2.5 with a preferred range of ratio of from 9 to 5. As is well understood in the art, an excessive amount of binder resin, herein the insulating polyester resin, will cause poor image reproduction because of the inability of the photoconductive pigment to form a continuous lattice.

Compositions of the invention may be prepared by the simple mixing of the solid polyester resin and the solid photoconductive pigment, in the presence or absence of a carrier solvent, in a blending mill, a ball mill, or similar mechanical means of mixing and grinding. A preferred method of preparing these blends is to dissolve the resin in a carrier solvent which is an inert organic solvent such as benzene or toluene, and add the photoconductive pigment to the solution. The mixture of resin solution and photoconductive pigment are then ground to a fineness of from 5 to 6½ on the NS Hegman scale. Where a carrier solvent is used, the combination of photoconductive composition and the carrier solvent is known in the art as a binder solution. In reality this is a dispersion since the photoconductive pigments are not dissolved.

Sensitizers may be included in said photoconductive compositions as optional ingredients. These sensitizers include bromophenol blue, disodium fluorescein, alizarin cyanine green GWA, and auramin O and other art recognized materials such as those listed in U.S. Pat. No. 3,245,786 starting at line 54, column 15. These sensitizers are usually added as 1 percent solutions in methanol. The concentration of these sensitizers will usually be from about 0.0005 to about 5.0 weight percent calculated upon the photoconductive pigment content of the photoconductive composition. A preferred amount of sensitizers is usually about 0.01 to 0.1 weight percent. The sensitizers may be used solely or as mixtures and a preferred composition contains bromophenol blue, alizarin cyanine green GWA, disodium fluorescein, and auramin O in a weight ratio of 1/1/1.4/0.1 respectively.

Using the binder solutions of this invention photoconductive recording material, which may be used in the direct electrophotographic process, can be prepared. Said photoconductive recording materials comprised of a conductive substrate and a photoconductive composition within those disclosed above and is in the form of paper-like sheets. The photoconductive recording material may comprise from about 15 to about 50 weight percent of a photoconductive composition of this invention. It is preferred that as little of the photoconductive composition be used as will guarantee a positive clear print. A preferred photoconductive recording material is a photoconductive paper.

Among the conductive substrated which may be used to prepare the photoconductive recording materials of this invention are sheets of: filled polyethylene or polypropylene; metal foils such as silver, gold, and aluminum; metal foil on a non-conductive or conductive paper base; other filled polymers such as filled polyvinyl chloride, and various papers which may be coated or uncoated depending upon the conductive properties of the paper. These papers include baryta-coated paper and glassine paper. The filled polyethylene or polypropylene contain from 15 to 30 parts of the polymer, from about 20 to 70 parts of calcium carbonate, aluminum silicate, silicone dioxide, kaolin or vermiculite, and from 10 to 50 parts of a plasticizer such as a plasticizer petroleum oil.

The preferred conductive substrate is a conductive paper. This preference arises from the similarity between these sheets and typical copies prepared by other means of printing. The conductive paper used as a substrate may be made by many means such as impregnating paper with a conductive material or coating paper with a barrier coating which is conductive. The latter technique has the additional advantage that the barrier coating can also effectively stop penetration of the substrate by the photoconductive layer.

Impregnating materials for conductive paper include sodium chloride, magnesium chloride, ammonium chloride, and these materials in humectant solutions such as in glycerine or sorbitol. Additional impregnating materials include acids such as benzene sulfonic acid and trichloro acetic acid. It has been found that a conductive polymer layer which is also a barrier coating reduces the effect of humidity on the reproduction quality of the final photoconductive paper. Among the conductive polymers are included such resins as alkyd resins and polymers containing quaternized ammonium moieties. Alkyd resins used in preparing photoconductive paper can also contain conductive fillers. An example of a typical alkyd resin is that made from crotonic acid, glycerol, dicyanodiamide, and zinc oxide plus tetrachlorophalic anhydride and sodium thiosulfate. Examples of typical conductive polymers are poly(vinylbenzenetrimethylammoniumchloride), poly[methylene(13,5-piperidinediyl-methochloride)], and quaternized polyethylene imine.

A preferred class of conductive polymers are conductive polyester resins prepared from a dicarboxylic acid and an etherified diphenol which can be represented by the formula

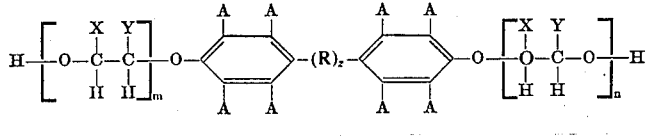

wherein z is 0 or 1, R is an an alkylene radical containing from 1 to 5 carbon atoms, oxygen, sulfur, or a divalent radical represented by the formula

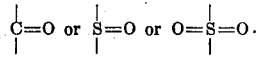

A is either a halogen atom or a hydrogen atom, and $m$ and $n$ are integers from 0 through 15 with the proviso that the sum of m and n is at least 7 and up to about 30. X and Y are individually selected from the group consisting of methyl radicals and hydrogen atoms with the proviso that in any X and Y pair of adjacent carbon atoms either X or Y is hydrogen. The dicarboxylic acid used in preparing these polyester resins can be either an unsaturated dicarboxylic acid or a mixture of unsaturated dicarboxylic acid and saturated dicarboxylic acids so long as at least about 10 percent of the acid is unsaturated. Naturally the etherified diphenol may be mixture of etherified diphenols so long as the average sum of n and m in any mixture is within the limits given above. The lower limit of 7 for the sum of $n$ and $m$ is critical since if the sum of $n$ and $m$ is less than 7 the polyester will not be sufficiently conductive. The dicarboxylic acid may be selected from those listed supra in the discussion of the insulating polyester resin.

A preferred dicarboxylic acid will contain from at least about 50 through about 100 percent unsaturated dicarboxylic acid, and preferred etherified diphenols are those where the sum of the integers represented by $m$ and $n$ will be from about 20 to about 9.

The resins used for preparing conductive paper are usually made insoluble in the standard organic polyester solvents. That is they will not readily dissolve in substances such as toluene, benzene, xylene, nitrobenzene, and other polyester solvents after being coated on the paper. This insolubility is produced by either cross-linking the polyester resins in situ with an unsaturated monomer such as styrene after coating the paper with a mixture of same, or making the salt of the polyester with a strong base, or introducing into the polyester resin a polyfunctional material such as sorbitol in sufficient quantity to make the resin insoluble, or reacting the polyester with amines.

The coatings of the conductive polymers are applied to the substrate by conventional coating techniques to form an even layer of the conductive polymer. This even layer enables the even spreading of the photoconductive layer.

The photoconductive paper prepared in accordance with this invention includes the conductive paper and the photoconductive composition disclosed above. Photoconductive paper may be prepared by the following procedure: a conductive resin is transferred to paper by a standard coating technique such as wire wound rods. The paper is force dried and after drying the photoconductive material is coated over the conductive paper and dried.

In order for those skilled in the art to fully understand the above disclosure and particularly illustrate the invention embodied herein, the following non-limiting examples are given. These examples include the preparation of the insulating polyester resins for use in the photoconductive compositions, preparation of photoconductive compositions, and the preparation of photoconductive recording material including photoconductive paper.

EXAMPLE 1

1865 grams of polyoxypropylene(2,2)-2,2-bis(4-hydroxyphenyl) propane and 2.9 grams of polyoxypropylene(6) sorbitol are charged to a 3-liter, four-necked, round-bottom reaction flask which is fitted with a thermometer, a stainless steel stirrer, a glass inlet tube, and a downward condenser. The flask is supported in a GLAS-COL electric heating mantle. Through the glass inlet tube nitrogen gas is allowed to flow sparging the polyol blend and resulting in an inert atmosphere in the reaction vessel. The agitator and heating mantle are then activated and the polyol blend is heated to 50°C. at which time 628 grams of fumaric acid and 1.25 grams of hydroquinone are added to the reaction vessel. The nitrogen gas flow is then regulated at a setting of 2.5 on a SHO-RATE meter of the Brooks Rotometer Company. The reaction mass is heated to a temperature of 210°C. over a period of 5 hours. Water of esterification is removed as it is formed and the mass is maintained at 210° C. for an additional 6½ hours. The course of the reaction is followed by acid value determinations at hourly intervals. At the end of the reaction, when an acid value of about 20 is achieved, the resin is cooled to room temperature. The resin has an acid value of 18.6, a ball and ring softening point of 104°C., a tack point of 75°C., and a liquid point of 100°C. The ratio of hydroxyl groups and carboxyl groups in the preparation of this resin is 1 to 1.

EXAMPLE 2

In accordance with the procedure of Example 1, 985 grams of polyoxyethylene(3) bis(4-hydroxyphenyl) ketone and 44.3 grams of polyoxyethylene(30) pentaerythritol are placed in a 3 liter, round-bottom flask. This mixture is heated and when the reaction temperature reaches 50°C., 348 grams of succinic acid are added. The reaction mixture is then heated to a temperature of 215°C. and the water of reaction is continually removed. The course of the reaction is followed by taking hourly samples in determining the acid value. After an acid value of 30 is reached the heat is removed and the reaction mixture is slowly cooled to room temperature. The resulting polyester is a hard, tough solid.

EXAMPLE 3

According to the procedure of Example 1, 2190 grams of polyoxyethylene(2.5)-2,2-bis(4-hydroxy-2,6-chlorophenyl) propane and 21 grams of polyoxyethylene(12) xylitol are placed in a four-liter flask. This mixture is heated and when a temperature of 50°C. is obtained, 465 grams of maleic acid is added. The heating is continued until a temperature of 210°C. is achieved at which point the temperature is maintained at 210°C. The water of esterification is removed as it is formed through a condenser. The acid value of the reaction mixture is tested at hourly intervals and when the acid number is less than 30, the reaction mixture is cooled to room temperature. The resultant polyester is a tough solid resin.

EXAMPLE 4

1882 grams of polyoxypropylene(2)-2,2-bis(4-hydroxy-phenyl) propane is charged to a reaction kettle, fitted with an air inlet tube, a condenser, an agitator, and a thermometer. This reaction component is then heated with stirring and inert gas purging. When the temperature reaches 80°C., 618 grams of fumaric acid and 1.25 grams of hydroquinone are added to the reaction vessel. The heating is continued until 210°C. is reached and then the temperature is maintained at this level. Periodic samples of the reaction mixture are taken and acid value is determined. When the acid value is less than 25 but more than 15, the reaction mixture is removed from the heat source and allowed to cool to room temperature on a tray cooler. The final acid value for this resin is 16.4 and the resin exhibits a ball and ring softening point of 103°C.

EXAMPLE 5

According to the procedure of Example 4, 631 grams of polyoxystyrene(6)-2,2-bis(4-hydroxyphenyl) propane, 114 grams of fumaric acid, and 0.4 grams of hydroquinone are reacted at a temperature of 210°C. until an acid value of less than about 25 is determined. The final acid value of this resin after cooling is 18.55.

EXAMPLE 6

According to the procedure of Example 4, 457 grams of polyoxybutylene(2)-2,2-bis(4-hydroxyphenyl) propane and 142 grams of succinic acid are reacted at a temperature of 210°C. The reaction is continued until an acid value of less than about 20 is reached. The resin is then cooled in an open pan and is found to have a ball and ring softening point of 68°C. and a final acid value of 14.1.

EXAMPLE 7

2140 grams of polyoxypropylene(2)-2,2-bis(4-hydroxy-phenyl) propane, 423 grams of ethylene glycol, 1,440 grams of fumaric acid, and 2 grams of hydroquinone are added to a five liter four-necked reaction flask, equipped with a stirrer, a gas inlet tube, a water cooled condenser, and a thermometer. The temperature of this mixture is slowly raised to 200°C. and is then maintained at this temperature with a distillation head temperature being between 100 and 103°C. avoiding the loss of the ethylene glycol. The reaction is continued until an acid value of less than about 25 is reached. The resin is then removed and cooled on an open pan and found to have a ball and ring softening point of 94°C. and an acid value of 18.6.

EXAMPLE 8

2025 grams of polyoxypropylene(2)-2,2-bis(4-hydroxy-phenyl) propane is added to a 4-liter, four-necked reaction vessel. This reactant is heated to 80°C. at which time 612 grams of the neopentyl glycol, 1,363 grams of fumaric acid, and 2 grams of hydroquinone are added to the reaction mixture. The reaction mixture is then heated to 210°C. and maintained at this temperature until an acid value of less than about 25 is reached. The resin is then cooled on an open pan and is found to have a ball and ring softening point of 95°C. and an acid value of 24.5.

EXAMPLE 9

5400 grams of polyoxystyrene(2)-2,2-bis(4-hydroxyphenyl) propane is charged to a 4-liter, four-necked reaction vessel. The reaction mass is heated with stirring and under an inert nitrogen atmosphere to 80°C. When the reaction mass is fluid, 2100 grams of an isophthalic acid is added and the reaction mixture heated to 210°C. After two hours the temperature is raised to 235°C. and held for 3 hours at this temperature at which point the temperature is raised to 250°C. and held at this temperature until the ball and ring softening point of a sample is 113°C.

EXAMPLE 10

522 grams of polyoxybutylene(2)-2,2-bis(4-hydroxyphenyl) propane is charged to a 4-liter, four-necked reaction vessel and heated to 80°C. At this point 227 grams of isophthalic acid are added and the reaction temperature raised to 250°C. The reaction is stopped after 8 hours at temperature. The final acid value of this resin is 27.2 and the ball and ring softening point is 94°C.

EXAMPLE 11

According to the procedure of Example 4, 488 grams of polyoxypropylene(2.2)-2,2-bis(4-hydroxyphenyl) propane, 160 grams of fumaric acid, and 0.33 grams of hydroquinone are reacted at a temperature of 210°C. until the acid value of the reaction mixture reaches 19.4. At this point in the reaction, 6.5 grams of 3,4-epoxy cyclohexylethyltrimethoxysilane is added. The reaction is allowed to proceed at 210°C. for an additional hour. The final resin has an acid value of 14.7 and a ball and ring softening point of 104°C.

EXAMPLE 12

According to the procedure of Example 4, 488 grams of polyoxyethylene(2.2)-2,2-bis(4-hydroxyphenyl) propane, 160 grams of fumaric acid, and 0.33 grams of hydroquinone are reacted at 210°C. until an acid value of 30.5 is reached. At this point 13 grams of phenyl glycidyl ether is added and the reaction continued at 210°C. until an acid value of less than 20 is determined. The resin is then cooled on a cooling pan and is found to have a ball and ring softening point of 93°C. and an acid value of 14.15.

EXAMPLE 13

According to the procedure of Example 4, 2175 grams of polyoxypropylene(2)-2,2-bis(2,6-dibromo-4-hydroxyphenyl) propane, 321 grams of maleic anhydride, and 1.25 grams of hydroquinone are reacted at 210°C. The resin has a final acid value of 17.5 and a ball and ring softening point of 133°C.

EXAMPLE 14

According to the procedure of Example 4, 524 grams of polyoxypropylene(2)-2,2-bis(4-hydroxyphenyl) propane, 176 grams of fumaric acid, and 0.35 grams of hydroquinone are reacted at 210°C. until an acid value of 56.5 is determined. Seventy grams of the diglycidyl ether of 2,2-bis(4-hydroxyphenyl) propane are then added to the reaction mixture and held for an additional 2 hours at 210°C. The resulting resin has a final acid value of 19.74.

EXAMPLE 15

According to the procedure of Example 4, 1882 grams of polyoxypropylene(2.2)-2,2-bis(4-hydroxyphenyl) propane, 618 grams of fumaric acid, and 1.25 grams of hydroquinone are reacted at 210°C. until the acid value is less than 30 but more than 25. At this point 75 grams of polyoxyethylene(1.1) cresol is added. The reaction is continued until an acid value of less than 20 is determined. The resin after cooling has an acid value of 10.8 and a ball and ring softening point of 103°C.

Examples of dispersions of the photoconductive compositions of this invention are given in Table I where parts are by weight in grams. The procedure for preparing these photoconductive composition dispersions is as follows:

The polyester resin is dissolved in one third of the solvent, i.e. toluene or other organic solvent, and is mixed with a slurry of photoconductive pigment in the remaining two thirds of the solvent. This mixture is then charged to an 8580 Eberbach stainless steel container fitted for Waring Blender and ground on this blender to a fineness of 5 to 6½ of the NS Hegman scale. Sensitizers are then added as a solution at a concentration of from ½ to 10 percent by weight.

The sensitizer listed as a component of the photoconductive composition of Table I can be either a single sensitizer or a combination of sensitizers and is used as a 1 to 2 percent solution in methanol or other equivalent solvents. The parts of the sensitizer listed in Table I are based upon the sensitizer portion of the sensitizer solution. Sensitizer A is a combination of bromophenol blue, disodium fluorescein, alizarin cyanine green GWA, and auramin O in a 10 to 14 to 10 to 1 ratio by weight and used as a 1 percent solution in methanol. Sensitizer B is a 1½ weight percent solution of bromomethyl blue in methanol. Sensitizer C is a 1 percent solution in ethanol of rosebengal and bromomethyl blue in a ratio of 10 parts by weight to 1 respectively. Sensitizer D is a mixture of the following sensitizers: bromocresol purple, alfazurine yellow, rosebengal and uranine in a 1 to 1 to 0.5 to 1 ratio respectively as a 2 percent solution in methanol.

The photoconductive pigments illustrated in Table I are all photoconductive quality and thus the zinc oxide is not normal pigment quality but is that produced by the usual French process for preparing photoconductive zinc oxide (Comprehensive treatise on Inorganic Chemistry by Mellor, Volume IV, 1927).

The photoconductive composition dispersion illustrated in Table I when applied to conductive paper yield photoconductive paper. In order to illustrate the quality of the photoconductive recording material prepared from the photoconductive compositions of this invention photoconductive recording material is prepared by the following procedure: A photoconductive composition according to Table I is applied to a paper made conductive by a coating of a polyquaternary ammonium type polymers as a conductive layer. Such a conductive paper is sold by Riegel Paper Company under the designation No. EC-37-AA. The photoconductive compositions are poured onto a sheet of the conductive paper and then spread across the paper by hand using a steel wire wound rod for evenly spreading the photoconductive compositions across the paper. After coating the sheets are dried for a period of from 1 to 2 minutes at 70°C. and the dry coated sheets are adapted, by maintaining them for at least 24 hours at 50 percent relative humidity and 25°C., before testing. The photoelectric properties of these sheets are tested by charging a sample of paper, measuring 3 ¼ by 5 ¼ inches, with a negative corona discharge unit, to the highest charge capacity of the paper in the dark. The negative corona discharge unit discharges between 8500 and 9500 volts. The absorbed charge (charge acceptance — CA) measured as volts/sample and the dark decay rate (DDR, volts per second) are then measured on an electrometer. Then a light of 6 foot candle power is switched on and the light decay rate (LDR, volts per second) is recorded on a Bristol recorder with an 0.4 second response. The weight of coating is determined as pounds of coating per ream (3,000 square feet) from which the pounds of coating per sample is calculated. B dividing the CA/sample by the pounds coating/sample the volts per pound of coating can be

TABLE II.—PHOTOCONDUCTIVE PAPER AND PROPERTIES

| Example number | Photoconductive composition of example | Pounds of photoconductive composition per ream of paper | CA volts/ pound coating | CA volts/ sample | DDR volts/ second/ sample | LDR volts/ second/ sample |
|---|---|---|---|---|---|---|
| 34 | 19 | 11.8 | 27.9 | 329 | 1.76 | 239 |
| 35 | 19 | 14.3 | 24.5 | 350 | 1.51 | 268 |
| 36 | 20 | 15.8 | 18.4 | 291 | 1.80 | 205 |
| 37 | 20 | 21.7 | 16.1 | 351 | 2.16 | 189 |
| 38 | 30 | 13.3 | 20.1 | 268 | 2.33 | 183 |
| 39 | 30 | 19.7 | 17.8 | 351 | 1.92 | 195 |
| 40 | 31 | 27.1 | 17.3 | 470 | 2.61 | 298 |
| 41 | 33 | 12.4 | 20.0 | 248 | 1.89 | 55 |
| 42 | 25 | 13.6 | 16.7 | 227 | 2.00 | 213 |
| 43 | 26 | 22.0 | 18.3 | 403 | 1.77 | 184 |
| 44 | 27 | 15.4 | 22.4 | 345 | 1.69 | 195 |
| 45 | 28 | 14.0 | 22.9 | 321 | 3.08 | 277 |
| 46 | 29 | 22.8 | 18.7 | 428 | 1.54 | 397 |
| 47 | 34 | 14.7 | 24.1 | 354 | 1.50 | 239 |

TABLE I.—EXAMPLES 16–34
[Dispersions of photoconductive compositions]

| Example number | Resin Ex. No. | Resin Parts | Solvent Type | Solvent Parts | Photoconductive type | Material parts | Sensitizer Type | Sensitizer Parts |
|---|---|---|---|---|---|---|---|---|
| 16 | 1 | 25 | Toluene | 90 | Zinc oxide | 115 | A | 0.0015 |
| 17 | 2 | 25 | do | 120 | do | 15.0 | A | 0.011 |
| 18 | 3 | 8.6 | do | 34 | do | 51.4 | A | 0.000115 |
| 19 | 4 | 8.6 | do | 38.7 | do | 51.4 | A | 0.000115 |
| 20 | 5 | 8.6 | do | 38.7 | do | 51.4 | A | 0.000115 |
| 21 | 6 | 10.0 | Benzene | 38 | Zinc sulfide | 50 | B | 0.005 |
| 22 | 7 | 12.0 | do | 44 | Lead oxide | 66 | C | 0.6 |
| 23 | 8 | 11.0 | do | 45 | Cadmium selenide | 70 | D | 0.0001 |
| 24 | 9 | 25.0 | Chlorobenzene | 95 | Zinc oxide | 100 | E | 0.001 |
| 25 | 10 | 8.6 | do | 40 | do | 150 | A | 0.000115 |
| 26 | 11 | 8.6 | do | 38 | do | 51.4 | A | 0.000115 |
| 27 | 12 | 8.6 | Xylene | 30 | do | 51.4 | A | 0.000115 |
| 28 | 13 | 8.6 | do | 30 | do | 51.4 | A | 0.000115 |
| 29 | 14 | 25.0 | Toluene | 95 | do | 150 | A | 0.000115 |
| 30 | 6 | 8.6 | do | 38.7 | do | 51.4 | A | 0.000115 |
| 31 | 7 | 8.6 | do | 38.7 | do | 51.4 | A | 0.000115 |
| 32 | 8 | 8.6 | do | 38.7 | do | 51.4 | A | 0.000115 |
| 33 | 9 | 8.6 | do | 38.7 | do | 51.4 | A | 0.000115 |
| 34 | 15 | 8.6 | do | 38.7 | do | 51.4 | A | 0.000115 | calculated. The data on coatings prepared by the above method and tested by the above methods are illustrated in Table II for the photoconductive compositions of this invention.

Examples of preparing a preferred photoconductive paper prepared from a preferred conductive paper using the conductive polyester described above are given below. Also examples of preparing the conductive polyester resins are given.

CONDUCTIVE POLYESTER RESIN EXAMPLES

EXAMPLE A 5,940 grams of polyoxypropylene(16)-2,2-bis(4-hydroxy-phenyl) propane; 575 grams of fumaric acid; and 2 grams of hydroquinone are added to a four-necked, 4-liter reaction vessel. This reaction mixture is purged with nitrogen and heated to 210°C. The water of esterification is removed through a condenser as it is formed. The acid value of the reaction mixture is determined by the taking of hourly samples. When the acid value falls below 25, the reaction is stopped by removing the mixture from the heat source and pouring the reaction mixture into an open pan. The resulting polyester resin is a viscous liquid.

EXAMPLE B 3,460 grams of polyoxyethylene(12)-2,2-bis(4-hydroxy-phenyl) propane; 540 grams of fumaric acid; and 2.0 grams of hydroquinone are placed in a four-necked, 4-liter reaction vessel. The reaction mixture is heated with stirring to a temperature of 210°C. ± 5°, and the reaction vessel is purged with nitrogen during the heat up period. Maintaining the 210°C. and the inert nitrogen atmosphere, hourly samples of the reaction mixture are taken and when the acid value of the polyester reaches less than 25, the reaction mixture is removed from the heat and poured into an open pan for cooling. During the course of the reaction the water of esterification is continually removed. The resultant cooled resin is a viscous liquid polyester with an acid value of 19.2.

EXAMPLE C

According to the procedure of Example 1, 1,436 grams of polyoxypropylene(9)-2,2-bis(4-hydroxyphenyl) propane; 232 grams of fumaric acid, and 1.1 grams of hydroquinone are added to a four-necked 4-liter reaction vessel. The reaction mixture is heated to 205°C. and samples taken every hour and the acid value determined. When the acid value was determined to be less than about 20 the reaction vessel was removed from the heat source and the resin poured into an open pan for cooling. The resulting resin is a viscous liquid polyester.

EXAMPLE 48

Thirty grams of conductive polyester resin of Example C is dissolved in 70 grams of toluene. An 8 ½ × 11 inch sheet of bond pater manufactured by the Riegel Paper Company and sold under the designation No. EC–35–XE is coated with the above resin solution using a No. 6 wire wound rod, by R. D. Specialties of Webster, New York, to spread the resin. The coated bond paper is then dried at 75°–100°C. for 15 minutes. The resulting paper is a flexible conductive paper.

A photoconductive composition containing 16.75 grams of the insulating polyester resin of Example 1, 100.00 grams of toluene, 133.3 grams of photoconductive ZnO and 0.00133 grams of sensitizer A described supra is coated on the above prepared conductive paper using a No. 14 wire wound brush. The coated conductive paper is dried at 75°C. for 20 minutes. This results in a good quality photoconductive paper.

EXAMPLE 49

According to the procedure of Example 48 a conductive paper is prepared by coating a sheet of EC–35–XE with a toluene solution of the polyester resin of Example B containing 30 parts of resin and 70 parts toluene.

According to the procedure of Example 48 a photoconductive paper is prepared by coating the conductive paper as described above with a photoconductive composition containing 16.75 grams of the insulating polyester resin of Example 2, 100 grams of toluene, 133.3 grams of ZnO, and 0.00133 grams of sensitizer A.

EXAMPLE 50

According to the procedure of Example 48 a photoconductive paper is prepared by first coating a sheet of No. EC–35–XE bond paper with a 30/70 parts solution of the polyester of Example A in toluene respectively, and then coating the resulting dried conductive composition containing 16.75 grams of the insulating polyester of Example 21, 100.00 grams of toluene, 133.3 grams of ZnO and 0.00133 grams of sensitizer. A.

The photoconductive compositions, and the photoconductive recording material or paper prepared from the photoconductive compositions can be used in any direct transfer electrostatic photographic technique.

Having thus described the invention the following is claimed:

1. A photoconductive composition which comprises a photoconductive pigment and an electrically insulating polyester resin in a weight ratio of from 15 to 2.5, wherein said electrically insulating polyester resin is a polyester resin of
   a polyol comprising an etherified diphenol represented by the formula

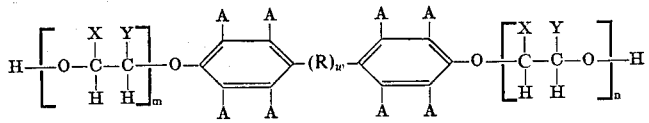

wherein w is 0 or 1, R is a alkylene radical of 1 to 5 carbon atoms, oxygen, sulfur or a divalent radical represented by the formula

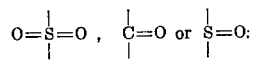

A is either a halogen atom or a hydrogen atom, $m$ and $n$ are intergers from 0 through 6 with the proviso that the sum of $n$ and $m$ is at least about 2 and less than 7, and X and Y are radicals individually selected from the group consisting of alkyl radicals of 1 to 3 carbon atoms, phenyl radicals, and hydrogen atoms with the proviso that in any X and Y pair on adjacent carbon atoms, either X or Y is hydrogen; and
a dicarboxylic acid, wherein the ratio of carboxyl groups to hydroxyl groups is about unity.

2. A photoconductive composition to claim 1 wherein said polyol contains in addition to said etherified diphenol polyol up to 60 weight percent of a dihydroxy alkane containing 2 to 8 carbon atoms.

3. A photoconductive composition according to claim 1 wherein said polyol contains up to 3 parts per 100 parts by weight of said etherified diphenol of a polyhydroxy alkane containing 3 to 6 carbon atoms and 3 to 6 hydroxyl groups or an ethylene or propylene oxide derivative of said polyhydroxy alkane containing up to 5 mols of propylene or ethylene oxide per hydroxyl group.

4. A photoconductive composition according to claim 1 wherein said electrically insulating polyester resin composition is modified with up to about 4 percent by weight based on said insulating polyester resin of either an organic epoxy compound having a molecular weight from about 44 to 1000, or an alkoxylated phenol, or an alkoxylated alkyl phenol.

5. A photoconductive composition according to claim 1 wherein said photoconductive pigment is selected from the group consisting of zinc oxide, zinc sulfide, antimony dioxide, and selenium oxide.

6. A photoconductive composition according to claim 1 wherein said etherified diphenol is an etherified bisphenol and said bisphenol is selected from the group consisting of 2,2-bis(4-hydroxyphenyl) propane; 2,2-bis(2,6-dichloro-4-hydroxy-phenyl) propane; and 2,2-bis(2,6-dibromo-4-hydroxyphenyl) propane, and said etherified bisphenol contain from two to four mols of oxyethylene or oxypropylene groups per mol of etherified bisphenol.

7. A photoconductive composition according to claim 4 wherein said organic epoxy compound is selected from the group consisting of 3,4-epoxy cyclohexylethyl trimethoxysilane, diglycidyl ether of 2,2-di(hydroxyphenyl) propane, phenylglycidyl ether, 1,2-epoxy eicosane, propylene oxide, ethylene oxide, and epichlorohydrin; and said alkoxylated phenol or alkoxylated alkyl phenol is selected from the group consisting of hydroxyethyl, 2-methylphenyl ether; polyoxybutylene(15)-6-propylphenol, and polyoxypropylene(3) phenol.

8. A photoconductive composition according to claim 2 wherein said polyol consists of said dihydroxy alkane and said etherified diphenol in a weight ratio of from 1.5 to 0.67.

9. A photoconductive recording material which comprises a conductive substrate coated with a photoconductive composition of claim 1.

10. A photoconductive recording material according to claim 9 wherein said conductive substrate consists essentially of paper coated with a conductive resin.

11. A photoconductive recording material which comprises a conductive substrate consisting essentially of paper coated with a conductive resin, coated with a photoconductive composition wherein said photoconductive composition is a composition of claim 4.

12. A composition of claim 1 wherein the dicarboxylic acid component is selected from the group consisting of fumaric, maleic, and succinic acids and anhydrides thereof.

13. A composition of claim 6 wherein the dicarboxylic acid component is selected from the group consisting of fumaric, maleic, and succinic acids and anhydrides thereof.

* * * * *

PO-1050
(5/69)

UNITED STATES PATENT OFFICE
CERTIFICATE OF CORRECTION

Patent No. __3,709,684__   Dated __January 9, 1973__

Inventor(s) __Joseph Feltzin et al.__

It is certified that error appears in the above-identified patent and that said Letters Patent are hereby corrected as shown below:

Column 1, Line 62, "comprises" should read -- comprised --.

Column 2, Line 60, "those where each A is either a chlorine atom atom or" should read -- those where each A is either a chlorine atom or --.

Column 3, Line 51, "polyoxyethylene((6)" should read -- polyoxyethylene(6) --.

Column 6, Line 3, "prepared. Said photoconductive recording materials" should read -- prepared. Said photoconductive recording material is --.

Column 6, Line 58, "poly[methylene(13,5-piperidinediyl-" should read -- poly[methylene(1-methyl-3,5-piperidinediyl- --.

Column 7, Line 8, after the word "through" and before the word "15", insert the word -- about --.

Column 7, Line 18, after the words "may be" and before the word "mixture in Line 19, insert the word -- a --.

Column 8, Example 1, Line 1, "polyoxypropylene(2,2)-2,2-" should read -- polyoxypropylene(2.2)-2,2- --.

Column 11, Table I, the headings "Photoconductive" and "Material" should be underlined so as to separate them from the subheadings "Type" and "Parts".

(Continued on next page)

PO-1050
(5/69)

UNITED STATES PATENT OFFICE
CERTIFICATE OF CORRECTION

Patent No. 3,709,684　　　　　　　　Dated　January 9, 1973

Inventor(s)　Joseph Feltzin et al.

It is certified that error appears in the above-identified patent and that said Letters Patent are hereby corrected as shown below:

Page 2 of 2

Column 12, Line 67, delete the word "B" and in its place insert the word -- By --.

Column 12, Line 68, before the words "coating/sample" insert the word -- of --.

Column 13, Line 62, the word "pater" should be deleted and replaced with the word -- paper --.

Signed and sealed this 29th day of May 1973.

(SEAL)
Attest:

EDWARD M. FLETCHER, JR.　　　　　　ROBERT GOTTSCHALK
Attesting Officer　　　　　　　　　　Commissioner of Patents